(12) United States Patent
Sone

(10) Patent No.: US 6,388,664 B2
(45) Date of Patent: *May 14, 2002

(54) METHOD AND APPARATUS FOR DISPLAYING ROAD MAP IN FORM OF BIRD'S EYE VIEW

(75) Inventor: Gaku Sone, Tokyo (JP)

(73) Assignee: Nissan Motor Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,331

(22) Filed: Feb. 14, 1997

(30) Foreign Application Priority Data

Feb. 26, 1996 (JP) ................................. 8-38221

(51) Int. Cl.$^7$ ................................. G06T 17/00
(52) U.S. Cl. ................................. 345/428
(58) Field of Search ................. 345/427; 340/990, 340/995; 701/210

(56) References Cited

U.S. PATENT DOCUMENTS

| | | | | |
|---|---|---|---|---|
| 5,555,354 A | * | 9/1996 | Strasnick et al. | 345/427 |
| 5,732,385 A | * | 3/1998 | Nakayma et al. | 701/201 |
| 5,748,109 A | * | 5/1998 | Kosaka et al. | 340/995 |
| 5,793,310 A | * | 8/1998 | Watanabe et al. | 340/995 |
| 5,897,604 A | * | 4/1999 | Takahashi et al. | 701/208 |
| 5,917,436 A | * | 6/1999 | Endo et al. | 340/995 |

FOREIGN PATENT DOCUMENTS

JP     7-190791     7/1995

* cited by examiner

*Primary Examiner*—Matthew Luu
*Assistant Examiner*—Motilewa Good-Johnson
(74) *Attorney, Agent, or Firm*—McDermott, Will & Emery

(57) ABSTRACT

In method and apparatus for displaying a road map mesh in a form of a bird's eye view on a display screen of a display unit, a virtual viewpoint at an upper sky behind a predetermined point of display reference (such as a present position of a mobile body, e.g., a vehicle) by a predetermined spatial distance is set, a part of the plan view formed road map mesh Z which is ahead of the predetermined display reference point is looked down along a line of sight along a predetermined looking down angle, the display screen Y is set on a plane vertical to the line of sight, the road map data on the plan view formed road map mesh corresponding to respective pixles on the display screen Y are extracted, and the bird's eye view on the display region X for the bird's eye view on the plan view formed road map mesh Z on the display screen Y on the basis of the extracted road map data.

18 Claims, 9 Drawing Sheets

FIG.3
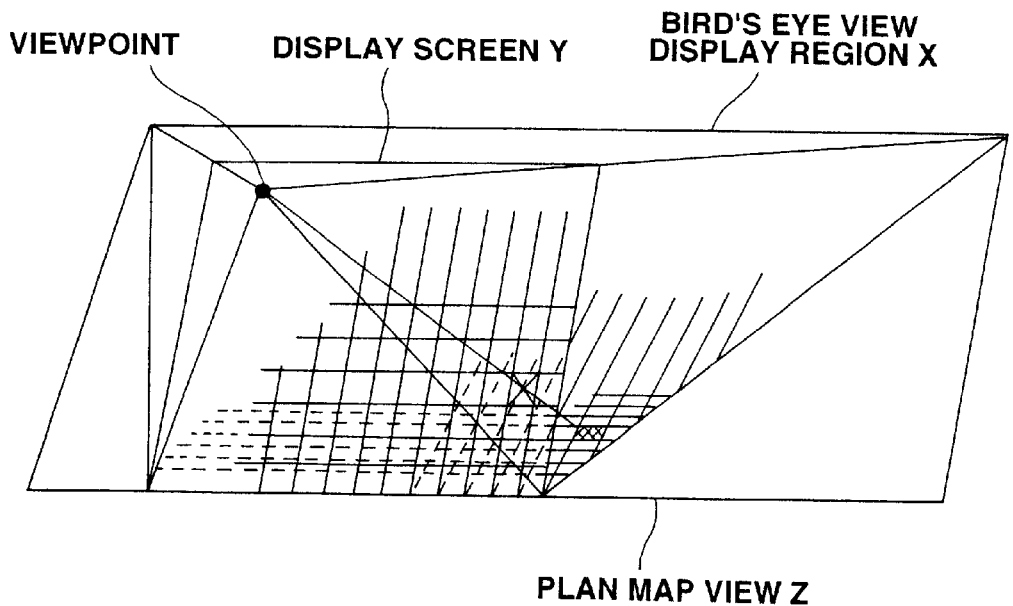
VIEWPOINT
DISPLAY SCREEN Y
BIRD'S EYE VIEW DISPLAY REGION X
PLAN MAP VIEW Z
FIG.4
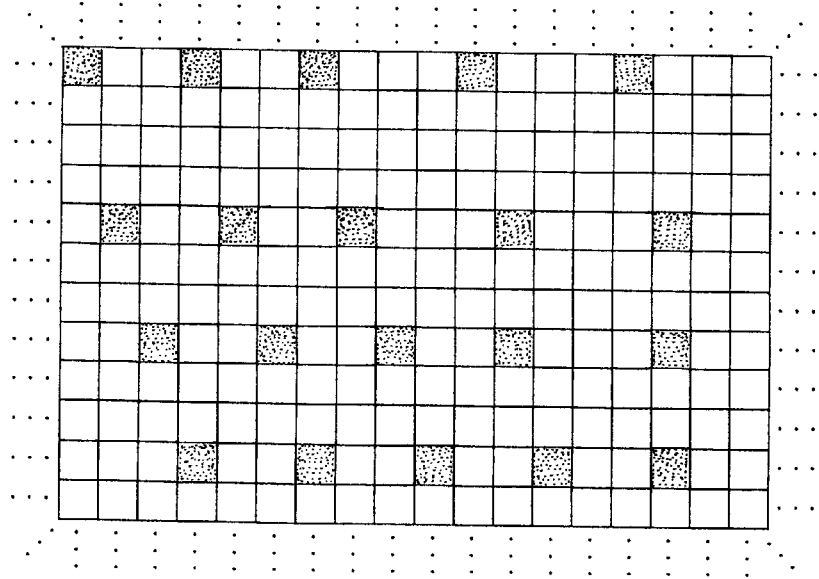
 ADOPTED DOT (TO BE DISPLAYED)
 UNADOPTED DOT (NOT TO BE DISPLAYED)

f(i, j) DENOTES THE INFORMATION ON DOT (i, j)

| | ⋮ | ⋮ | ⋮ | ⋮ | ⋮ | ⋮ |
|---|---|---|---|---|---|---|
| (INFORMATION ON LINE n) | ⋯ | f(n, m+1) | f(n, m+4) | f(n, m+7) | f(n, m+11) | ⋯ |
| (INFORMATION ON (n+4) LINE) | ⋯ | f(n+4, m+2) | f(n+4, m+5) | f(n+4, m+8) | f(n+4, m+12) | ⋯ |
| | ⋮ | ⋮ | ⋮ | ⋮ | ⋮ | ⋮ |

→ TIME

METHOD AND APPARATUS FOR DISPLAYING ROAD MAP IN FORM OF BIRD'S EYE VIEW

BACKGROUND OF THE INVENTION

The present invention relates to method and apparatus for displaying a road map in a form of bird's eye view.

The present invention is applicable to apparatus for navigating a vehicle to a destination using a display unit.

A Japanese Patent Application First Publication No. Heisei 7-190791 exemplifies a previously proposed apparatus for executing a coordinate transformation of a plan view formed road map piece (mesh) into a bird's eye view (perspectively projected view).

However, since the previously proposed apparatus executes the coordinate transformation even if a scrolling operation for a display screen is carried out, a processor capable of processing a large amount of data (a processor having a high processing capability) is required in order to maintain a scrolling velocity to some degree. This causes an increase in a total cost of assembling the whose apparatus.

SUMMARY OF THE INVENION

It is an object of the present invention to provide method and apparatus for displaying a road map mesh in a form of bird's eye view on a display screen of a display unit without use of a processor having a high processing capability and at a high drawing velocity of the bird's eye view.

The above-described object can be achieved by providing a method for displaying a road map mesh in a form of bird's eye view on a display screen of a display unit, comprising:

a) storing the road map mesh in a form of a plan view;

b) placing a virtual viewpoint at an upper sky behind a predetermined position of display reference on the plan view formed road map mesh by a predetermined distance;

c) looking down at the plan view formed road map mesh forward away from the predetermined point of display reference from said virtual viewpoint along a line of sight having an angle of field of view with respect to the predetermined point of display reference;

d) setting the display screen on a plane perpendicular to the line of sight;

e) extracting road map data from the plane view formed road map mesh corresponding to respective pixels on the display screen from the plan view formed road map mesh; and, f) drawing the bird's eye view of the plan view formed road map mesh on the display screen on the basis of the extracted road map data.

The above-described object can also be achieved by providing an apparatus for displaying a road map mesh in a form of bird's eye view on a display screen of a display unit, comprising:

a memory arranged for storing the road map mesh in a form of a plan view; and a picture drawing processor arranged for placing a virtual viewpoint at an upper sky behind a predetermined point of display reference by a predetermined distance, looking down at the plan view formed road map mesh forward away from the predetermined point of display reference from said virtual viewpoint along a line of sight having an angle of field of view with respect to the predetermined point of display reference, setting the display screen on a plane perpendicular to the line of sight, extracting road map data on the plan view formed map mesh corresponding to respective pixles on the display screen from the plan view formed road map mesh, and drawing the bird's eye view of the plan view formed road map mesh on the display screen on the basis of the extracted road map data.

BRIEF DESCRIPTION OF THE DRAWINGS

FIG. 3 is an explanatory view for explaining the relationship between the plan view formed road map mesh Z having the scale of reduction A and shown in FIG. 2, the display region X for the bird's eye view on the plan view formed road map mesh Z, and the display screen Y.

FIG. 4 is an explanatory view for explaining a pattern of adopted data (dots, black quadrangles) and unadopted data (dots, blank (white) quadrangles) not to be displayed as the bird's eye view on the plan view formed road map (Z) having the scale of reduction A.

BEST MODE FOR CARRYING OUT THE INVENTION

Reference will hereinafter be made to the drawings in order to facilitate a better understanding of the present invention.

Figure 1:
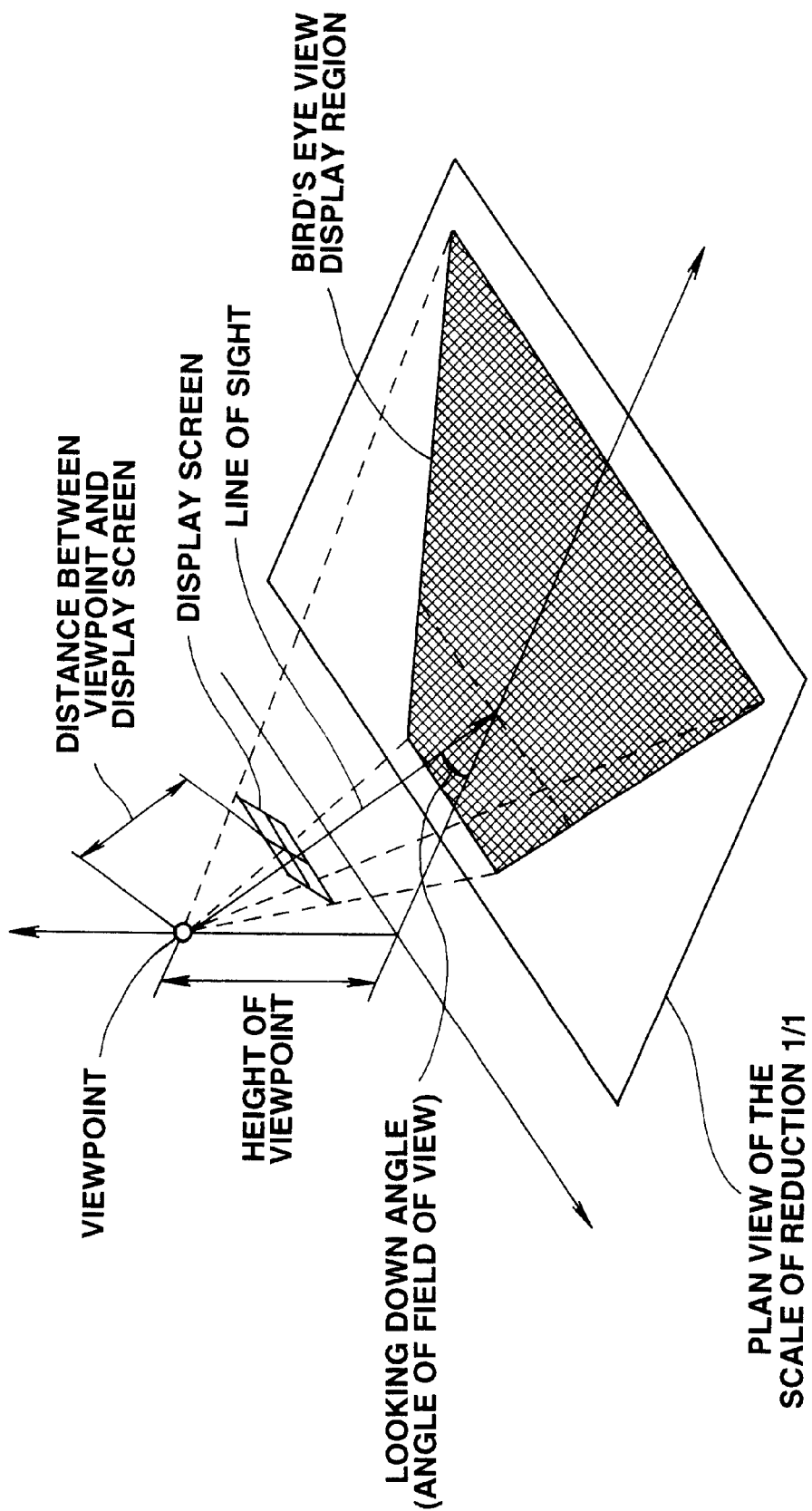
FIG. 1 is an explanatory view for explaining a relationship between a (virtual) viewpoint, a display screen for a bird's eye view, and a region of the bird's eye view on a plan view formed road map mesh.

FIG. 1 shows a relationship between a (virtual) viewpoint of a bird's eye view, a display screen on the bird's eye view, and a display region for the bird's eye view to be displayed on a plan view formed road map mesh.

It is noted that the road map mesh is a square shaped road map of topographical road map, i.e., a predetermined piece of regional (local) road map. One road map mesh is divided into the road map mesh pieces to be described later.

A road map in a form of the bird's eye view is prepared (generated) as follows:

First, the virtual viewpoint is set at an upper sky position whose height is predetermined behind a predetermined point of display reference (in the case of a navigation system, the predetermined display reference point corresponds to a present position of a vehicle in which the navigation system is mounted). And, a forwarding direction (an opposite direction to the viewpoint with the display reference point included) is looked down along a line of sight through a predetermined looking down angle (an angle of field of view) and a display screen for the bird's eye view is set on a plane perpendiculalr (vertical) to the line of sight. Then, a perspective projection transformation of the plan view formed road map mesh from the viewpoint through the display screen for the bird's eye view is carried out. That is to say, a coordinate transformation of the plan view formed road map mesh data represented by plan view road map coordinates into the display screen coordinates on the bird's eye view.

It is herein noted that if the height of viewpoint from the plan view formed road map mesh is varied from among the height of the viewpoint, the looking down angle, and a distance from the viewpoint to the display screen, the displayed region is accordingly varied. However, if, at the same time when the height of the viewpoint is varied, a scale of reduction of the plan view formed road map mesh, the same region can be displayed.

Figure 2:
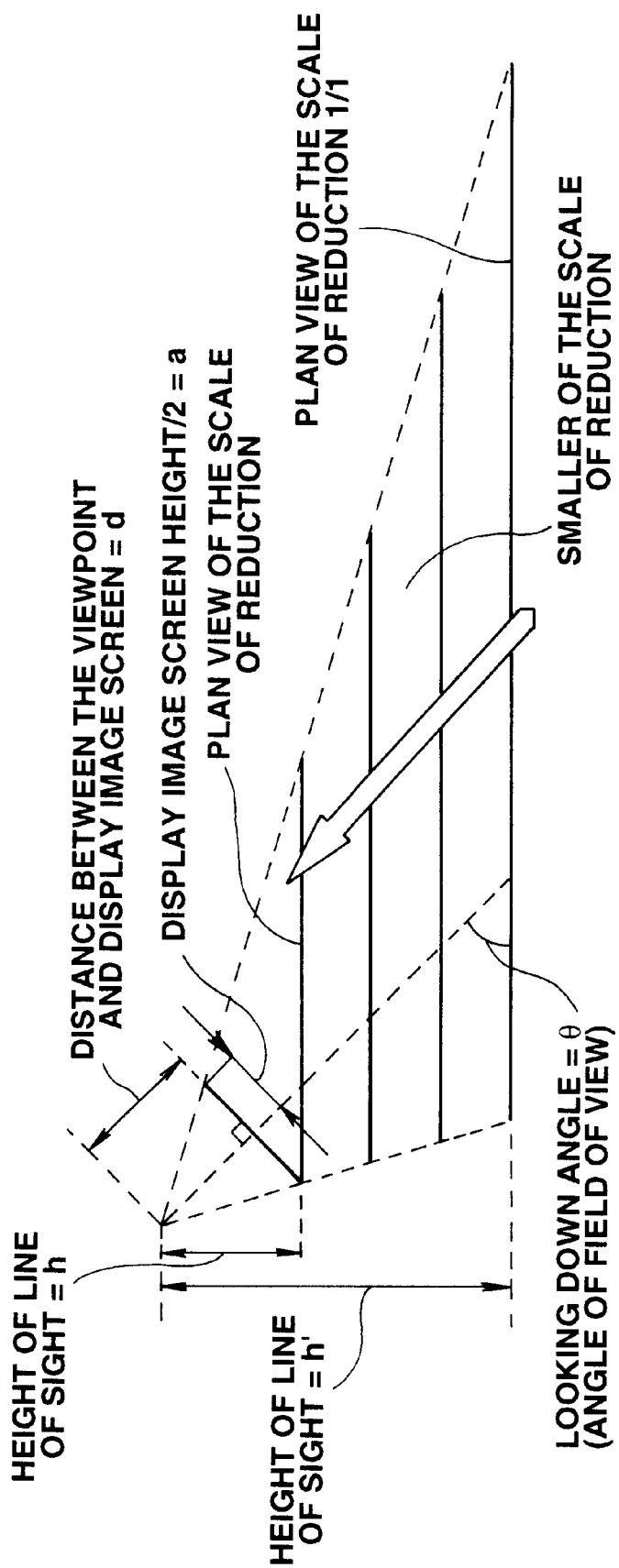
FIG. 2 is a relationship between a height of the viewpoint from the plan view formed road map mesh and a scale of reduction that the plan view formed road map mesh has.
Figure 5:
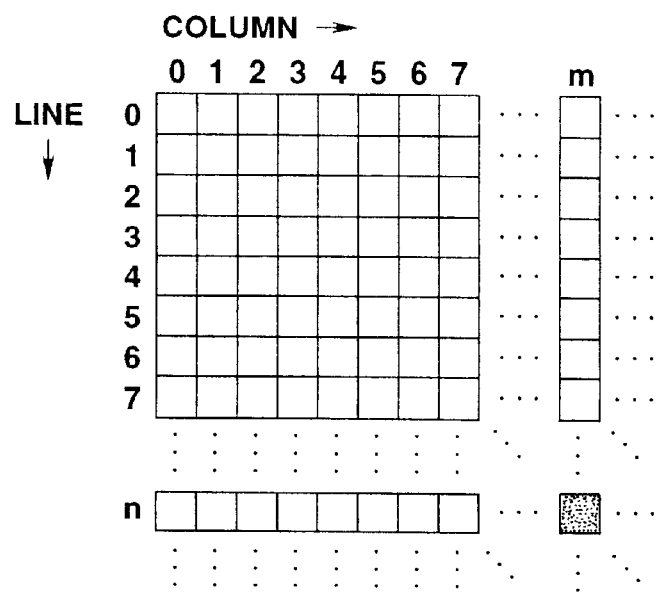
FIG. 5 is an explanatory view of an arrangement of a dot pattern on the plan view formed road map mesh.

FIG. 2 shows a relationship between the height of the viewpoint and the scale of reduction of the plan view formed road map mesh (piece).

As shown in FIG. 2, it is possible to display the same region on the plan view formed road map mesh, if the scale of reduction of the plan view formed road map mesh is made smaller (1/1, 1/2, - - - , 1/n) at the same time when the height of the viewpoint is lowered.

Suppose now that the height of the viewpoint from the plan view formed road map mesh having the scale of reduction A is h, the looking down angle is θ, the distance between the viewpoint and display screen is d, and the height (width in a vertical direction) of the display screen is 2a.

When the height h of the viewpoint is lowest, the scale of reduction A of the plan view formed road map mesh is expressed as follows:

$$A = \{\sqrt{(a^2+d^2)} \times \sin(\theta + \tan^{-1}(a/d))\}/h \quad (1).$$

Suppose that a height of the viewpoint from the plan view formed road map mesh having the scale of reduction of 1/1 is denoted by h'.

If the angle of the field of view (looking down angle) θ, the distance from the viewpoint to the display screen d, and the display screen height 2a are set to constants, the display region when the plan view formed road map mesh having the scale of reduction A is displayed in the form of the bird's eye view is the same as that when the plan view formed road map mesh having the scale of reduction of 1/1.

Next, a new method will be described which displays the plan view formed road map mesh having the scale of reduction A on the display screen having the height 2a under a display condition including the height h of the viewpoint, the looking down angle θ, and the distance d between the viewpoint and the display screen.

This new method according to the present invention is carried out without the above-described coordinate transformation from the plan view formed road map mesh to the bird's eye view display screen.

FIG. 3 shows a relationship between the plan view formed road map (mesh) Z having the scale of reduction A in FIG. 2, the display region X in which the bird's eye view is displayed on the plan view formed road map (mesh) Z, and the display screen Y of the bird's eye view.

The display unit to display the road map sets a display color for each dot to form one display screen. The display screen of the display unit is constituted by a predetermined number of the dots. One dot means a minimum unit of display, i.e., a pixel.

During the coordinate transformation from the plan view formed road map Z having the scale of reduction A to the display screen Y, the x axis and y axis of both plan view formed road map mesh Z and display screen Y are handled at the same scale so that the plan view formed road map mesh Z having the scale of reduction A may be considered to be constituted by the same dots of coarseness as the display screen Y.

In the plan view formed road map mesh Z having the scale of reduction A and the display screen Y having the mutual relationship to each other, a straight line is virtually drawn from the viewpoint to the plan view formed map mesh Z passing through a center of each dot on the display screen Y so that the dot at a point of each straight line intersected with the plan view formed road map mesh Z corresponds to the dot corresponding to each dot having the display screen Y is defined as a dot corresponding to each dot on the display screen Y.

The display color set on the corresponding one of the dots on the plan view formed road map mesh is a display color of each corresponding dot on the display screen Y to form one screen. Consequently, the bird's eye view in the display region X can be represented on the display screen Y without execution of the coordinate transformation described above.

In other words, if the dots other than those corresponding to the respective dots of the display screen Y are omitted (unadopted) from the dots present on the plan view formed road map mesh Z having the scale of reduction A, the display region X of the plan view formed road map mesh Z can be displayed in the form of the bird's eye view.

FIG. 4 shows a dot pattern of the adopted dots (black quadrangles) for the bird's eye representation and the omitted (unadopted) dots (blank quadrangles) not for the bird's eye representation on the plan view formed road map mesh Z having the scale of reduction A shown in FIG. 3.

These adopted dots on the plan view formed road map mesh Z are dots corresponding to the respective dots on the display screen Y shown in FIG. 3. This dot pattern is varied according to the display condition such as the height of the viewpoint, the looking down angle, and the distance between the viewpoint and the displace screen. Hence, it is desirable for the dot patterns which correspond to the various display conditions of the bird's eye view to be stored previously in a memory.

Or, alternatively, since the display condition on the bird's eye view is not frequently varied, the dot pattern may be calculated at a time when the above-described display condition is established.

In a preferred embodiment of a method for displaying the road map mesh in the form of the bird's eye view, each dot on the plan view formed road map mesh Z is represented by a matrix coordinate of a line (n=1, 2, 3, - - - ) and a column (m=1, 2, 3, - - - ), as a minimum square shape including the bird's eye view region X. It is noted that Z denotes a region enclosing the display region X of the bird's eye view on the plan view formed road map mesh having the scale of reduction A.

Figure 6:
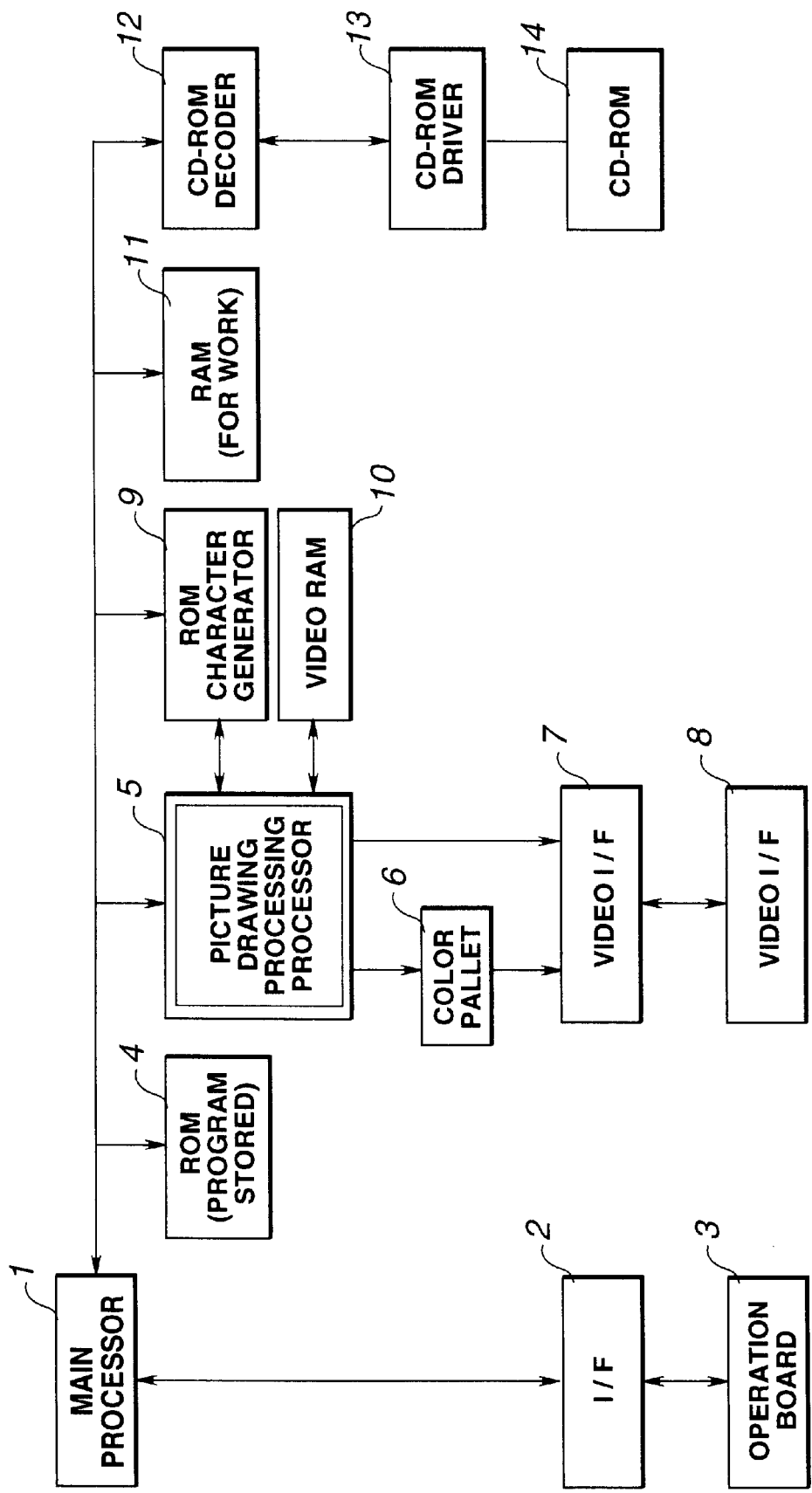
FIG. 6 is a circuit block diagram of an apparatus for displaying a road map mesh in a form of bird's eye view on a display screen of a display unit in a preferred embodiment according to the present invention.

FIG. 6 shows a structure of the apparatus for displaying the road map mesh in the form of the bird's eye view in the preferred embodiment according to the present invention.

A main processor processor 1 executes a sequence control of the whole apparatus and various types of calculations. An operation board 3 is connected to the main processor 1 via an interface 2.

The operation board 3 includes a direction key(s) to scroll the display screen. A ROM (Read Only Memory) 4 stores various processing programme such as for the scrolling operation.

A picture drawing (purpose) processor 5 carries out the bird's eye view drawing processing by means of the adopted and unadopted dots (dot extracting process), (the bird's eye view drawing processing caused by the coordinate transformation), and the scrolling process. A color palette 6, a video signal interface 7, a display 8, ROM (character generator) 9, a video-RAM (V-RAM) 10 are connected to the picture drawing processor 5. The RAM 11 is used for the temporary storage of the various data.

The picture drawing processor 5 is connected with an external CD-ROM 14 for storing plan view formed road mesh(es) via a decoder 12 and a driver 13.

Figure 7:
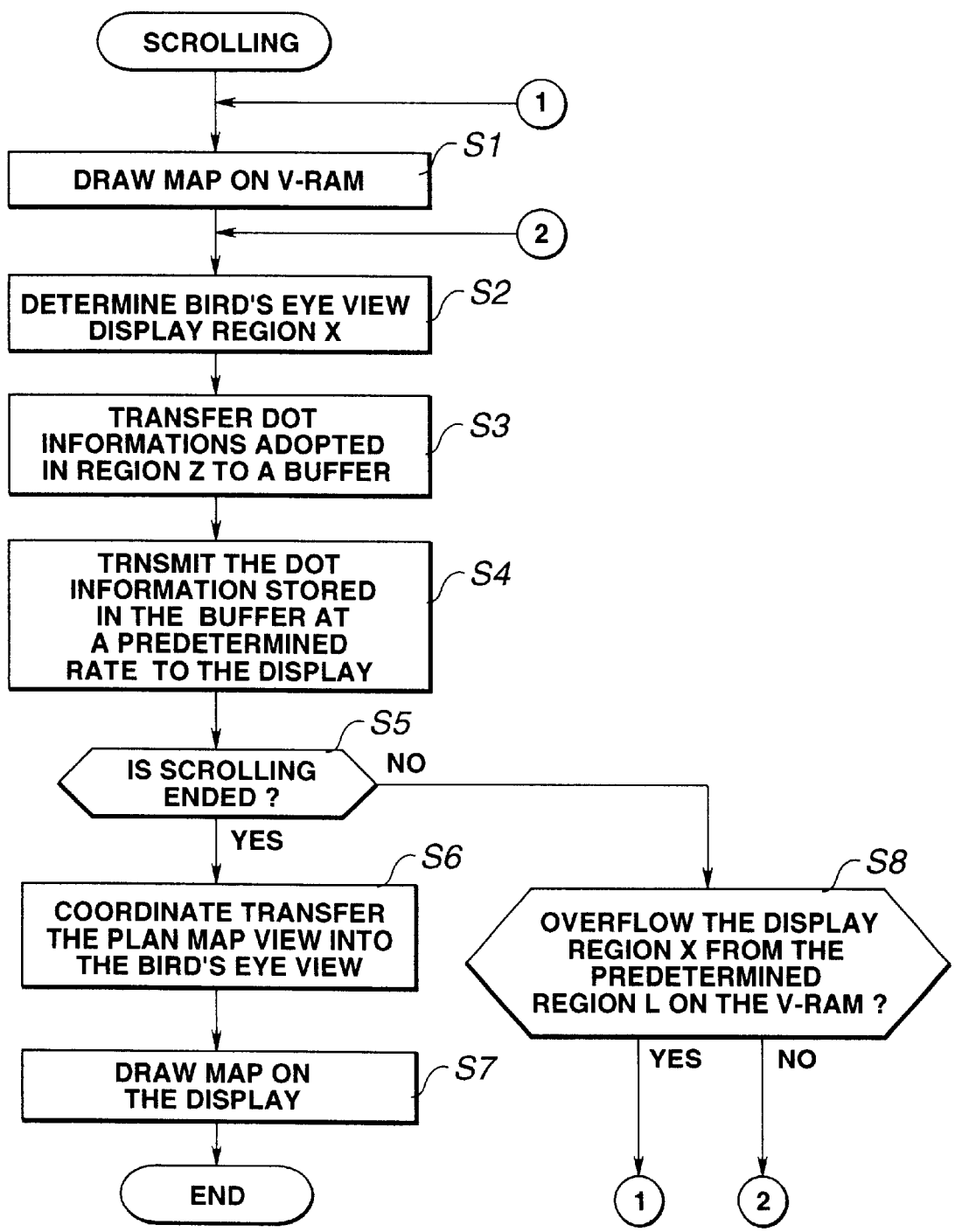
FIG. 7 is an operational flowchart executed in the road map mesh displaying apparatus shown in FIG. 6.

FIG. 7 shows an operational flowchart indicating the scrolling process.

In the embodiment, the picture drawing processor 5 starts the processing routine of FIG. 7 when the scrolling process is carried out via the operation board 3.

At a step S1, the CPU (the picture drawing processor) 5 reads the plan view formed road map mesh data from the CD-ROM 14 and draws the plan view formed road map mesh having the predetermined scale of reduction A. It is noted that, at this time, the information which becomes unclear when the bird's eye view is displayed due to the omission of the dots, namely, the characters or symbols are not drawn but the information of line represented roads and railways and a polygon information such as a park or lake are drawn.

At the subsequent step S2, the picture drawing processor 5 determines the display region X for the bird's eye view on the basis of the display condition on the bird's eye view such as the previously set height of the viewpoint h, the looking down angle θ, and the distance between the viewpoint and display screen.

Figure 8:
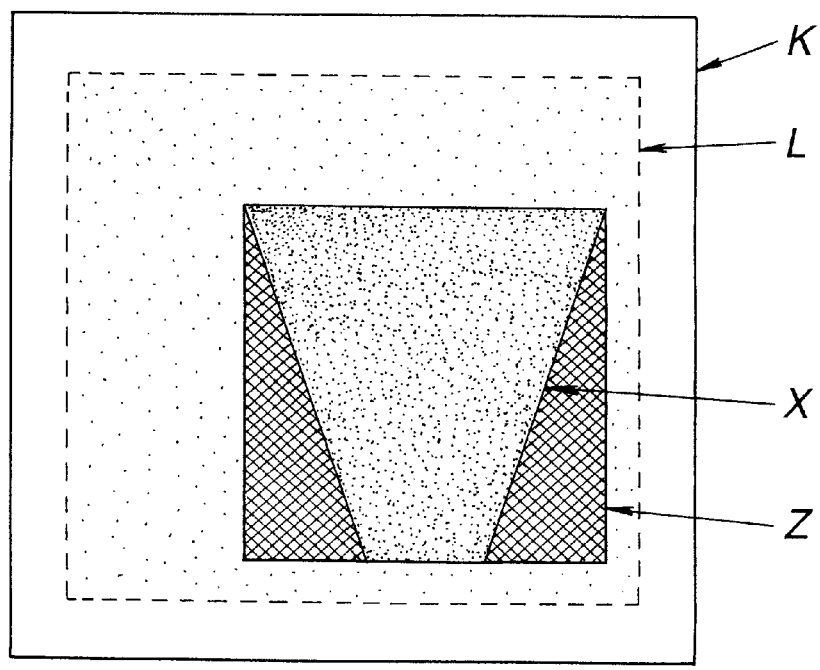
FIG. 8 is an explanatory view representing a relationship between a region X capable of drawing the road map mesh on a V-RAM shown in FIG. 6 and a region X capable of displaying the bird's eye view.

FIG. 8 shows the relationship between the road map mesh drawing range K on the V-RAM 10 and the display region X of the bird's eye view.

The V-RAM 10 has a sufficient capacity to a degree such that even when the display region X for the bird's eye view is moved within the plan view formed drawing range K in response to the scrolling process of the display screen, the display region X does not immediately fall out of (overflow) the drawing range K (predetermined region K). The region Z is a region in the minimum square shape including the display region X of the bird's eye view.

The region L is a region to determine the update of the plan view formed road map mesh on the V-RAM 10.

Referring back to FIG. 7, at a step S3, the picture drawing processor 5 transfers the information of the adopted dots (values of Red, Green, and Blue (R, G, B) only along the line in which the adopted dots (at least one adopted dot) for the bird's eye view are present from a line 0 of the region Z in a sequence of younger column number into a buffer of the picture drawing processor 5.

Figures 9, 10:
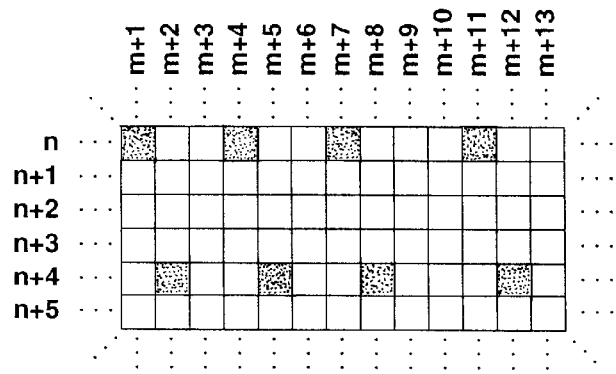
FIG. 9 is an explanatory view of explaining a procedure to transfer an information of the dots adopted to represent the bird's eye view to a buffer.
FIG. 10 is an explanatory view of the information on the dots adopted to represent the bird's eye view stored in the buffer.

For example, in a case where the adopted dots are present in the line n and in the (n+4) line as shown in FIG. 9, the information on the adopted dots is stored in the buffer as shown in FIG. 10.

Next, at a step S4, the information (color) on the adopted dots stored in the buffer of the picture drawing processor 5 is transmitted to the display (unit) 8 via the color pallet(e) 6 and via the video signal interface 7.

Figure 11A:
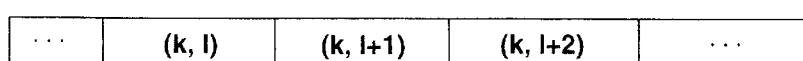
FIGS. 11(A) and 11(B) are explanatory view for explaining a method of transmitting a video signal from the buffer to the display unit shown in FIG. 6.
Figure 11B:
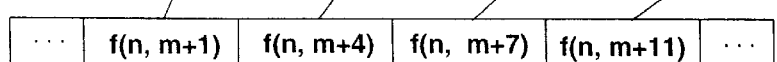

At this time, the dot information stored in the buffer shown in FIG. 11(B) is transmitted at a dot rate (dot/sec.) of the display 8 for one line as shown in FIG. 11(A).

At a step S5, the picture drawing processor 5 confirms whether the scrolling operation from the operation keyboard 3 (keyboard) is ended. If the scrolling operation is ended (Yes), the routine goes to a step S6. If not ended (No) at the step S5, the routine goes to a step S8. When the scrolling operation is ended at the step S6, the display region X for the bird's eye view on the plan view formed road map mesh is coordinate transformed into the bird's eye view. At the subsequent step S7, the coordinate transformed bird's eye view is drawn on the display unit 8. In other words, upon the end of the scroll, the bird's eye view is again drawn with the plan view formed road map coordinate transformed. A user friendly bird's eye view (easily recognizable) can be displayed and the information such as a character or symbol can also be displayed.

On the other hand, when the scrolling operation is continued, at the step S8, the picture drawing processor 5 determines whether the display region X for the bird's eye view overflows the predetermined region L described above. If the overflow occurs at the step S8, the routine returns to the step S1 to update the plan view formed road map mesh on the V-RAM 10. If the overflow does not occur, the routine returns to a step S2 so as to determine the display region X for the bird's eye view.

The V-RAM having a considerably large memory capacity is required in order to draw the plan view formed road map having a considerably wider range K than the display region X for the bird's eye view as shown in FIG. 8. Hence, a modification of the preferred embodiment which can use the V-RAM having a relatively low capacity will be described below.

The road map display in the form of the bird's eye view is such that as the distance from the predetermined point of display reference (namely, the present position of the vehicle) to a position to be viewed from the displayed bird's eye view becomes long, namely, as a viewing position becomes far away from the present position, an actual display area per unit area on the display screen becomes wider. Hence, many roads and characters are displayed with high density in a narrower region as it becomes far way from the predetermined point of display reference. Hence, in order to secure a visibility in the case of the bird's eye view, the kind of information is reduced as the viewed position becomes far away. Specifically, the scale of reduction on the bird's eye view based plan view formed road map mesh is varied.

Figure 12:
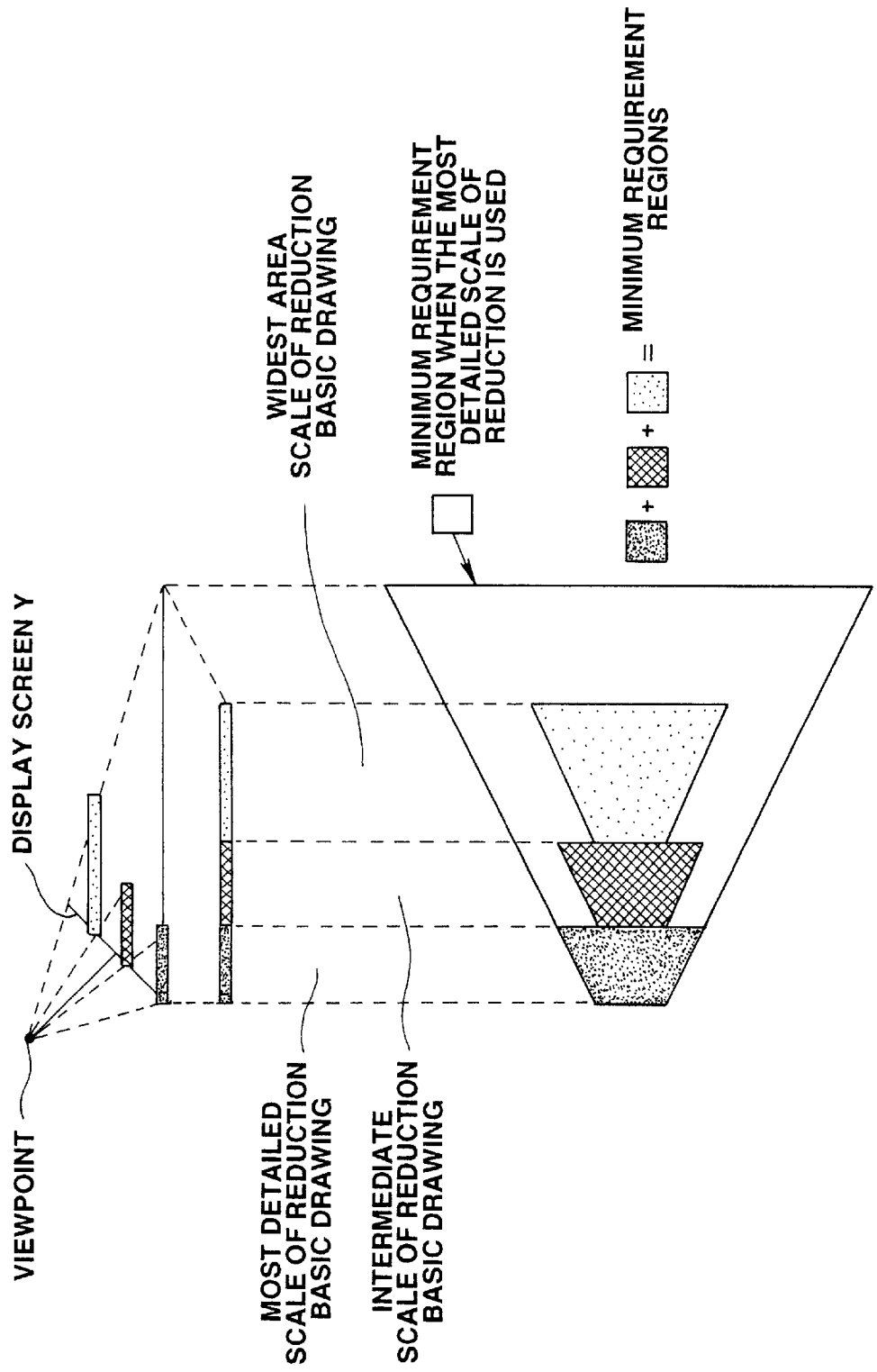
FIG. 12 is an explanatory view for explaining a modification of the preferred embodiment in which the display screen is divided into a plurality of display regions.
Figure 13:
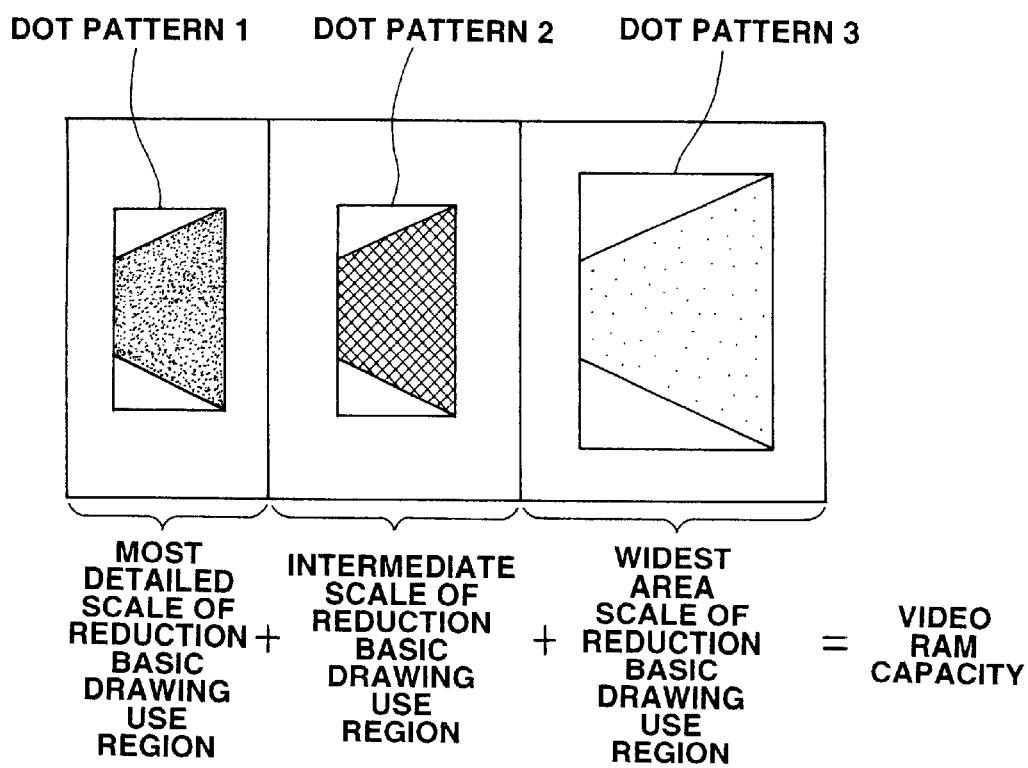
FIG. 13 is an explanatory view for explaining a dot pattern on each divided display region in the case of the modification of the preferred embodiment shown in FIG. 12.

In the modification, as shown in FIG. 12, the display region X for the bird's eye view is divided into, e.g., three (display region), the plan view formed road map mesh piece having the scale of reductions respectively corresponding to the respective divided regions are basic road maps. That is to say, the basic road map mesh piece having the most detailed road map information contained scale of reduction (lowest scale of reduction) is used for one of the divided display regions surrounding the predetermined point of display reference (present position), the basic road map mesh piece having the intermediate scale of reduction is used for a second one (a center area) of the divided display regions, and the road map mesh piece having the most widest area indicating scale of reduction (highest scale of reduction) is used for another third one of the divided display regions on the upper part of the display screen, as shown in FIG. 12. Then, as shown in FIG. 13, the dot pattern is set for each divided region and the omitting (dot adopted and dot unadopted) process described above is carried out. The omitted dot processed road map mesh pieces are drawn for the respective divided regions.

According to this modification method, the display region is an addition of the display region corresponding to the three divided display regions. Hence, since the display region is the modification shown in FIG. 13 becomes smaller than the case wherein only the most detailed information contained basic road map mesh as in the case of the preferred embodiment is used, the capacity of the V-RAM can be reduced and the data quantity of the plan view formed road map mesh read from the CD-ROM 14 can be reduced and the drawing process of the plan view formed road map mesh can be relieved.

As described above, although the drawing process according to the dot adopted and unadopted method is carried out during the scroll operation on the display (image) screen, the drawing process according to the above-described method may be carried out during the execution time other than the scroll process. In this case, after the drawing process is carried out for the road map mesh containing the lines and/or polygons, the information of the character and symbol is drawn without the dot omitting process (dot adopted and unadopted method described above) on the drawn road map mesh.

Although, in the embodiment, the road map information is processed according to the dot adopted and unadopted method in a unit of the dots, i.e., in a unit of the pixels, the drawing of the bird's eye view may be carried out by setting the coordinates on the plan view formed road map mesh corresponding to the respective pixles on the display screen and by extracting only the road map information on the set coordinates.

Furthermore, the number of the divided display regions on the display screen and the dividing method are not limited to the modification of the preferred embodiment described above.

It is noted that the method for executing the coordinate transformation of the plan view formed road map mesh into the bird's eye view (perspective projection representation) after the scrolling operation described in the embodiment shown in FIG. 7 is exemplified by the United States patent application Ser. No. 08/384,715 (attorney docket No. 305-472), (the content of the disclosure of which being herein incorporated by reference). It is finally noted that the navigating apparatus for the mobile body such as a vehicle to which the present invention is applicable is exemplified by the same United States Patent Application identified above.

What is claimed is:

1. A method for displaying a road map mesh in a form of bird's eye view on a display screen of a display unit, comprising:

a) storing the road map mesh in a form of a plan view;

b) placing a virtual viewpoint at an upper sky behind a predetermined point of display reference on the plan view formed road map mesh by a predetermined distance;

c) looking down from the virtual viewpoint at the plan view formed road map mesh forward away from the predetermined point of display reference having an angle of field of view with respect to the predetermined point of display reference;

d) setting the display screen on a plane perpendicular to a line of sight passing the viewpoint and the predetermined point of display reference on the plan view formed road map mesh to form a looking down angle to the plan view formed road map mesh;

e) predefining a dot pattern representing a correspondent relationship between the pixels of the plan view formed road map and those of the display image screen;

f) extracting a part of the pixels of the plan view formed road map from the plan view formed road map which has the correspondent relationship of the dot pattern and simultaneously omitting the other part of the pixels thereof from the same plan view formed road to enable the display of only a bird's eye view display region in the plan view formed road map mesh on the display screen; and g) displaying the extracted pixels of the plan view formed road map mash on the display screen during moving of the virtual viewpoint according to a scrolling process.

2. A method for displaying a road map mesh in a form of bird's eye view on a display screen of a display unit as claimed in claim 1, which further comprises the step of dividing the display screen into a plurality of display regions and wherein the road map data are extracted from the road map mesh for the respective display regions and, at the step e), the bird's eye view is drawn on the divided display regions of the display screen on the basis of the road map data for each display region.

3. A method for displaying a road map mesh in a form of bird's eye view on a display screen of a display unit as claimed in claim 2, wherein said predetermined point of display reference is a present position of a mobile body which carries an apparatus for displaying a road map mesh in the form of the bird's eye view on the display screen of the display unit.

4. A method for displaying a road map mesh in a form of bird's eye view on a display screen of a display unit as claimed in claim 3, wherein said mobile body is an automotive vehicle.

5. A method for displaying a road map mesh in a form of bird's eye view on a display screen of a display unit as claimed in claim 4, wherein the plan view formed road map mesh has a scale of reduction A and the road map data on the plan view formed road map mesh having a scale of reduction A comprise a plurality of dots with set colors, and wherein, at the step d), the dots, other than those corresponding to the respective dots on the display screen, are omitted from those on the plan view formed road map mesh having the scale of reduction A so as to achieve the bird's eye view of the plan view formed road map mesh on the display screen.

6. A method for displaying a road map mesh in a form of bird's eye view on a display screen of a display unit as claimed in claim 5, wherein said steps e) and f) comprise the steps of:

g) setting a bird's eye view display region on the plan view formed road map mesh according to a bird's eye view display condition including a height of said virtual viewpoint from the plan view formed road map mesh, the angle of field of view, and a distance from the viewpoint to the display screen;

h) setting matrix coordinates (m, n) within the bird's eye view display region according to the bird's eye view display condition; and i) extracting only the dots on the set matrix coordinates at the step h) so as to display the bird's eye view of the plan view formed road map mesh.

7. A method for displaying a road map mesh in a form of bird's eye view on a display screen of a display unit as claimed in claim 6, wherein said scale of reduction A of the plan view formed road map mesh is expressed as follows:
A=$\{\sqrt{(a^2+d^2)} \times \sin(\theta+\tan^{-1}(a/d))\}/h$, wherein a denotes a half of the height of the display screen itself, d denotes a straight distance from the viewpoint to the display screen, θ denotes the angle of field of view from the viewpoint to the predetermined point of display reference, and h denotes a height of the virtual viewpoint from the plan view formed road map mesh having the scale of reduction A.

8. A method for displaying a road map mesh in a form of bird's eye view on a display screen of a display unit as claimed in claim 7, wherein, if h' denotes a height of the viewpoint from the plan view formed road map mesh having the scale reduction of 1/1 with the distance from the viewpoint to the display screen, the angle of the field of view from the viewpoint to the predetermined point of display reference θ, and the height of the display screen itself being set constants, a display region in which the bird's eye view is displayed in the case of the height h has the same as that in the case of the height h'.

9. An apparatus for displaying a road map mesh in a form of bird's eye view on a display unit, comprising:
a memory arranged for storing the road map mesh in a form of a plan view; and
a picture drawing processor arranged for placing a virtual viewpoint at an upper sky behind a predetermined point of display reference by a predetermined distance, looking down from the virtual viewpoint at the plan view formed road map mesh forward away from the predetermined point of display reference having an angle of field of view with respect to the predetermined point of display reference, setting the display screen on a plane perpendicular to a line of sight passing the viewpoint and the predetermined point of display reference on the plan view formed road map mesh to form a looking down angle to the plan view formed road map mesh, predefining a dot pattern representing a correspondent relationship between pixels of the plan view formed road map and those of the display screen, extracting a part of the pixels of the plan view formed road map mesh from the plan view formed road map which has the correspondent relationship of the dot pattern and simultaneously omitting the other part of the pixels thereof from the same plan view formed road map to enable the display of only a bird's eye view display region in the plan view formed road map mesh on the display screen, and displaying the extracted pixels on the display screen during moving of the virtual viewpoint according to a scrolling process.

10. An apparatus for displaying a road map mesh in a form of bird's eye view on a display screen of a display unit as claimed in claim 9, which further comprises a command input operation unit arranged for inputting a scroll command to said picture drawing processor extracts the road map data on the plan view formed road map mesh corresponding to respective pixels on the display screen from the plan view formed road map mesh and draws the bird's eye view of the plan view formed road map mesh on the display screen on the basis of the extended road map data while said scroll command is received thereby.

11. An apparatus for displaying a road map mesh in a form of bird's eye view on a display screen of a display unit as claimed in claim 10, wherein said picture drawing processor further executes a perspective transformation of the plan view formed road map into the bird's eye view so as to display the transformed bird's eye view on the display screen when the scroll command input to the picture drawing processor is ended.

12. An apparatus for displaying a road map mesh in a form of bird's eye view on a display screen of a display unit as claimed in claim 11, wherein said picture drawing processor divides the display screen into a plurality of display regions and wherein said picture drawing processor extracts the road map data from the road map mesh for the respective display regions and the bird's eye view is drawn on the divided display regions of the display screen on the basis of the road map data for each display region.

13. An apparatus for displaying a road map mesh in a form of bird's eye view on a display screen of a display unit as claimed in claim 12, wherein said memory stores character data on the road map mesh and wherein said picture drawing processor executes the extraction of the road map data without extracting of the character data on the road map mesh.

14. An apparatus for displaying a road map mesh in a form of bird's eye view on a display screen of a display unit as claimed in claim 13, which further comprises a Video-RAM capable of temporarily storing a predetermined region of the road map data on the plan view formed road map mesh, wherein said picture drawing processor determines whether the display region of the bird's eye view overflows the predetermined region, and wherein said picture drawing processor updates the road map data on the plan view formed road map mesh when determining that the display region of the bird's eye view overflows the predetermined region.

15. An apparatus for displaying a road map mesh in a form of bird's eye view on a display screen of a display unit as claimed in claim 14, wherein said road map data includes road lines and polygons.

16. An apparatus for displaying a road map mesh in a form of bird's eye view on a display screen of a display unit as claimed in claim 12, wherein a scale of reduction of each display region is varied according to a distance of the corresponding one of the regions to be displayed from the predetermined point of display reference.

17. A method f or displaying a road map mesh in a form of bird's eye view on a display screen of a display unit, comprising:
a) storing the road map mesh in a form of a plan view;
b) placing a virtual viewpoint at an upper sky behind a predetermined point of display reference on the plan view formed road map mesh by a predetermined distance;
c) looking down from the virtual viewpoint at the plan view formed road map mesh forward away from the predetermined point of display reference having an angle of field of view with respect to the predetermined point of display reference;
d) setting the display screen on a plane perpendicular to a line of sight passing the viewpoint and the predetermined point of display reference on the plan view formed road map mesh to form a looking down angle to the plan view formed road map mesh;
e) virtually drawing straight lines from the virtual viewpoint to the plan view formed road map mesh passing through centers of the respective dots on the display screen to define the dot at a point of each straight line intersected with the plan view formed road map mesh as that corresponding to each dot that the display screen has;

f) forming one image screen with a display color set the corresponding dots of the plan view formed road map mesh as the display color of the dots of the display screen to enable the display of a bird is eye view display region on the display screen; and g) displaying the bird's eye view display region of the plan view formed road map mesh on the display screen.

18. An apparatus for displaying a road map mesh in a form of bird's eye view on a display unit, comprising:

a memory arranged for storing the road map mesh in a form of a plan view; and a picture drawing processor arranged for placing a virtual viewpoint at an upper sky behind a predetermined point of display reference by a predetermined distance, looking down from the virtual viewpoint at the plan view formed road map mesh forward away from the predetermined point of display reference having an angle of field of view with respect to the predetermined point of display reference, setting the display screen on a plans perpendicular to a line of sight passing the viewpoint and the predetermined point of display reference on the plan view formed road map mesh to form a looking down angle to the plan view formed road map mesh, virtually drawing straight lines from the virtual viewpoint to the plan view formed road map mesh passing through centers of the respective dots on the display screen to define the dot at a point of each straight line intersected with the plan view formed road map mesh as that corresponding to each dot that the display screen has: forming one image screen with a display color set the corresponding dots of the plan view formed road map mesh as the display color of the dots of the display screen to enable the display of a bird's eye view display region on the display screen; and displaying the bird's eye view display region of the plan view formed road map mash on the display screen.

\* \* \* \* \*